United States Patent [19]
Coetzer

[11] Patent Number: 6,007,943
[45] Date of Patent: Dec. 28, 1999

[54] HIGH TEMPERATURE ELECTROCHEMICAL CELL WITH MOLTEN ALKALI METAL ANODE

[75] Inventor: Johan Coetzer, Pretoria, South Africa

[73] Assignee: Electro Chemical Holdings Societe Anonyme, Luxembourg

[21] Appl. No.: 09/020,214

[22] Filed: Feb. 6, 1998

[30] Foreign Application Priority Data

| Feb. 6, 1997 | [ZA] | South Africa | 97/0981 |
| Jun. 5, 1997 | [ZA] | South Africa | 97/4968 |
| Jul. 9, 1997 | [ZA] | South Africa | 97/6116 |

[51] Int. Cl.[6] .................................................. H01M 10/39
[52] U.S. Cl. ........................ 429/104; 429/102; 429/103; 429/105; 429/231.9
[58] Field of Search ................................. 429/102, 103, 429/104, 105, 231.9

[56] References Cited

U.S. PATENT DOCUMENTS

| 3,488,221 | 1/1970 | Shimotake et al. | 136/20 |
| 3,514,332 | 5/1970 | Minck | 136/6 |
| 3,716,409 | 2/1973 | Cairns et al. | 136/6 |
| 3,783,024 | 1/1974 | Gibson et al. | 136/6 |
| 3,841,914 | 10/1974 | Boyle et al. | 136/111 |
| 3,901,733 | 8/1975 | Toy et al. | 136/153 |
| 3,932,195 | 1/1976 | Evans et al. | 136/6 FS |
| 3,985,575 | 10/1976 | Ludwig | 429/103 |
| 4,041,215 | 8/1977 | Kormanyos et al. | 429/104 |
| 4,049,885 | 9/1977 | Mitoff | 429/104 |
| 4,068,045 | 1/1978 | Abrams | 429/81 |

(List continued on next page.)

FOREIGN PATENT DOCUMENTS

| 0 001 351 | 4/1979 | European Pat. Off. . |
| 0 064 234 | 4/1982 | European Pat. Off. . |
| 0114233 | 8/1984 | European Pat. Off. . |
| 0 390 185 A2 | 10/1990 | European Pat. Off. . |
| 0 399 786 A2 | 11/1990 | European Pat. Off. . |
| 2135125 | 2/1972 | France . |
| 3338955 A1 | 5/1985 | Germany . |
| 3718918 | 12/1987 | Germany . |
| 1050694 | 12/1966 | United Kingdom . |
| 1 344 069 | 1/1974 | United Kingdom . |
| 1 421 702 | 1/1976 | United Kingdom . |

(List continued on next page.)

OTHER PUBLICATIONS

Mikkor, "Volume Optimization of Sodium–Sulfur Batteries Using Various Advanced Cell Concepts", The American Institute of Aeronautics and Astronautics, vol. 1 of 3, Proceedings of the 15th Intersociety Energy Conversion Engineering Conference, Energy of, Aug. 1980.

Bittihn et al., "The Swing system, a nonaqueous rechargeable carbon/metal oxide cell," Journal of Power Sources, pp, 223–231, 1993. month N/A.

(List continued on next page.)

Primary Examiner—Maria Nuzzolillo
Assistant Examiner—J. O'Malley
Attorney, Agent, or Firm—Arnold White & Durkee

[57] ABSTRACT

An electrochemical cell comprises a housing defining an interior space, and a separator in the housing dividing said space into an anode compartment and a cathode compartment. A sodium anode is in the anode compartment, a cathode being in the cathode compartment, electrochemically coupled by the separator to the anode. The anode is molten, the separator being a conductor of sodium cations and comprising at least 5 tubes having open and closed ends, the cathode being in the tubes and each tube communicating with a header space in an electronically insulating header. The relationship of the combined area of the tubes available for sodium conduction, and the volume of the interior space, as defined by the quotient:

$$\frac{\text{combined separator tube area } (l^2)}{\text{housing interior space volume } (l^3)}$$

(in which 1 is a unit length), has a value of at least 1.0 $l^{-1}$.

19 Claims, 7 Drawing Sheets

U.S. PATENT DOCUMENTS

| Patent No. | Date | Inventor | Class |
|---|---|---|---|
| 4,091,151 | 5/1978 | Minck | 429/104 |
| 4,206,272 | 6/1980 | Fischer et al. | 429/62 |
| 4,220,691 | 9/1980 | Roth et al. | 429/104 |
| 4,220,692 | 9/1980 | Hunt | 429/104 |
| 4,226,923 | 10/1980 | Mikkor | 429/104 |
| 4,230,778 | 10/1980 | von Benda et al. | 429/104 |
| 4,269,905 | 5/1981 | Wedlake | 429/8 |
| 4,279,974 | 7/1981 | Nishio | 429/104 |
| 4,310,607 | 1/1982 | Shay | 429/104 |
| 4,348,467 | 9/1982 | Wright | 429/94 |
| 4,366,215 | 12/1982 | Coetzer et al. | 429/199 |
| 4,405,696 | 9/1983 | Fischer et al. | 429/104 |
| 4,414,299 | 11/1983 | Ansell | 429/104 |
| 4,419,419 | 12/1983 | Knödler | 429/104 |
| 4,424,262 | 1/1984 | von Alpen et al. | 429/8 |
| 4,476,201 | 10/1984 | Repenning et al. | 429/62 |
| 4,492,742 | 1/1985 | Haberfellner et al. | 429/104 |
| 4,497,879 | 2/1985 | Lüke et al. | 429/62 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,568,502 | 2/1986 | Theodore et al. | 264/63 |
| 4,588,662 | 5/1986 | McManis, III et al. | 429/52 |
| 4,592,969 | 6/1986 | Coetzer et al. | 429/50 |
| 4,626,483 | 12/1986 | Bones et al. | 429/50 |
| 4,659,637 | 4/1987 | Nelson et al. | 429/104 |
| 4,683,179 | 7/1987 | Langpale et al. | 429/104 |
| 4,722,875 | 2/1988 | Wright | 429/103 |
| 4,728,590 | 3/1988 | Redey | 429/221 |
| 4,732,741 | 3/1988 | Duncan et al. | 423/119 |
| 4,772,449 | 9/1988 | Bones et al. | 419/2 |
| 4,795,685 | 1/1989 | Bones et al. | 429/104 |
| 4,797,333 | 1/1989 | Coetzer et al. | 429/103 |
| 4,800,143 | 1/1989 | Harbach et al. | 429/153 |
| 4,846,943 | 7/1989 | Coetzer et al. | 204/61 |
| 4,894,299 | 1/1990 | Morse | 429/104 |
| 4,910,105 | 3/1990 | Tilley et al. | 429/103 |
| 4,925,749 | 5/1990 | Wright | 429/104 |
| 4,973,534 | 11/1990 | Adendorff et al. | 429/103 |
| 4,975,343 | 12/1990 | Coetzer | 429/103 |
| 4,975,344 | 12/1990 | Wedlake et al. | 429/103 |
| 4,992,345 | 2/1991 | Meintjes et al. | 429/103 |
| 5,006,427 | 4/1991 | Böhm et al. | 429/101 |
| 5,019,466 | 5/1991 | Coetzer et al. | 429/103 |
| 5,051,324 | 9/1991 | Bones et al. | 429/193 |
| 5,053,294 | 10/1991 | Sernka et al. | 429/104 |
| 5,059,497 | 10/1991 | Prince et al. | 429/193 |
| 5,061,580 | 10/1991 | Wedlake et al. | 429/103 |
| 5,143,802 | 9/1992 | Wright | 429/103 |
| 5,158,839 | 10/1992 | Wright | 429/103 |
| 5,187,029 | 2/1993 | Coetzer et al. | 429/102 |
| 5,196,279 | 3/1993 | Tarascon | 429/194 |
| 5,208,119 | 5/1993 | Duncan | 429/103 |
| 5,219,682 | 6/1993 | Bones et al. | 429/193 |
| 5,230,968 | 7/1993 | Bones et al. | 429/191 |
| 5,234,778 | 8/1993 | Wright | 429/103 |
| 5,279,908 | 1/1994 | Bones et al. | 429/102 |
| 5,283,135 | 2/1994 | Redey et al. | 429/103 |
| 5,316,877 | 5/1994 | Thackeray et al. | 429/197 |
| 5,340,668 | 8/1994 | Redey et al. | 429/103 |
| 5,403,676 | 4/1995 | Coetzer et al. | 429/50 |
| 5,441,829 | 8/1995 | Attwood et al. | 429/158 |
| 5,472,806 | 12/1995 | Meintjes | 429/165 |
| 5,476,732 | 12/1995 | Coetzer | 429/103 |
| 5,476,733 | 12/1995 | Coetzer et al. | 429/103 |
| 5,716,731 | 2/1998 | Goetzer et al. | 429/103 |

FOREIGN PATENT DOCUMENTS

| Number | Date | Country |
|---|---|---|
| 2 018 013 | 10/1979 | United Kingdom . |
| 1 586 659 | 3/1981 | United Kingdom . |
| 2 064 206 | 6/1981 | United Kingdom . |
| 2 082 379 | 3/1982 | United Kingdom . |
| 2 114 114 | 8/1983 | United Kingdom . |
| 2 122 412 | 1/1984 | United Kingdom . |
| 2 164 786 | 3/1986 | United Kingdom . |
| 2 159 661 | 12/1986 | United Kingdom . |
| 2 191 332 | 12/1987 | United Kingdom . |
| 2 191 333 | 12/1987 | United Kingdom . |
| 2 192 305 | 1/1988 | United Kingdom . |
| 2 210 612 | 6/1989 | United Kingdom . |
| 2 213 310 | 8/1989 | United Kingdom . |
| 2 221 213 | 1/1990 | United Kingdom . |
| 2 225 667 | 6/1990 | United Kingdom . |
| 2 226 181 | 6/1990 | United Kingdom . |
| 2 226 442 | 6/1990 | United Kingdom . |
| 2 226 692 | 7/1990 | United Kingdom . |
| 2 227 357 | 7/1990 | United Kingdom . |
| 2 231 567 | 11/1990 | United Kingdom . |
| 2 234 233 | 1/1991 | United Kingdom . |
| 2 240 424 | 7/1991 | United Kingdom . |
| 2 242 306 | 9/1991 | United Kingdom . |
| 2 242 898 | 10/1991 | United Kingdom . |
| 2 244 701 | 12/1991 | United Kingdom . |
| 2 245 264 | 1/1992 | United Kingdom . |
| 2 246 904 | 2/1992 | United Kingdom . |
| 2 251 119 | 6/1992 | United Kingdom . |
| 2 257 426 | 1/1993 | United Kingdom . |
| 2 270 195 | 3/1994 | United Kingdom . |
| 2 276 759 | 10/1994 | United Kingdom . |
| 2 280 779 | 2/1995 | United Kingdom . |
| 2 281 436 | 3/1995 | United Kingdom . |
| 2 285 535 | 7/1995 | United Kingdom . |
| 2 290 163 | 12/1995 | United Kingdom . |
| 2302757 | 1/1997 | United Kingdom . |
| WO 93/07650 | 4/1993 | WIPO . |

OTHER PUBLICATIONS

Mikkor, "Volume Optimization of Sodium–Sulfur Batteries Using Various Advanced Cell Concepts," *The American Institute of Aeronautics and Astronautics*, vol. 1 of 3, Proceedings of the 15th Intersociety Energy Conversion Engineering Conference, "Energy to the 21st Century," Seattle, Washington, Aug. 1980.

Neuman, Tony, South African Patent Application No. 94/0054 entitled "Electrochemical Cell", dated Jan. 5, 1994.

Pett et al., "Plate–Type Beta Alumina Electrolytes for an Advanced Sodium–Sulfur Cell Design",*Am. Ceramic Bulletin*, 64(4):589–592, 1985.

Seo et al., "Investigation of High Temperature Battery Systems", Technical Report prepared for Army Electronics Command, Distributed by National Technical Information Service: U.S. Dept. of Commerce, Jan. 1974.

Tarascon et al., "The Spinel Phase of $LiMn_2O_4$ as a Cathode in Secondary Lithium Cells," *J. Electrochem. Soc.*, 138(10):2859–2864, Oct., 1991.

HIGH TEMPERATURE ELECTROCHEMICAL CELL WITH MOLTEN ALKALI METAL ANODE

THIS INVENTION relates to a high temperature rechargeable electrochemical cell. More particularly the invention relates to such cell which is suitable for high power applications, and the invention relates to a method of making such cell.

According to the invention there is provided a high temperature rechargeable electrochemical cell which comprises a housing defining an interior space, a ceramic solid electrolyte separator located in the housing and dividing the interior space into an anode compartment and a cathode compartment, an alkali metal active anode material located in the anode compartment, and an active cathode material located in the cathode compartment and electrochemically coupled by the solid electrolyte separator to the active anode material, the cell having an operating temperature at which the active anode material is molten and the solid electrolyte separator being of a material which is a conductor of cations of the active anode material, the solid electrolyte separator comprising a multiplicity of at least 5 ceramic solid electrolyte separator tubes, each tube having an open end and a closed end, the active cathode material being located in the interiors of the tubes and each tube having its open end hermetically sealed to an associated opening leading from the tube into a header space defined by a header comprising electronically insulating ceramic material, the relationship of the combined area of the tubes available for conduction of cations of active anode material between the anode compartment and the cathode compartment, and the volume of the interior space, as defined by the quotient:

$$\frac{\text{combined separator tube area } (l^2)}{\text{housing interior space volume } (l^3)}$$

(in which l is a unit of length), having a value of at least $1.0 \, l^{-1}$.

The multiplicity of tubes will usually amount to at least 10, with the quotient or said combined area/interior space volume relationship being at least $1.5 \, l^{-1}$. In a preferred embodiment of the invention, the multiplicity of tubes may amount to at least 25, with the quotient or said combined area/interior space volume relationship being at least $2.0 \, l^{-1}$.

Typically, the active anode material will be sodium, the material of the separator being selected from a suitable ceramic solid-electrolyte conductor of sodium cations, such as β-alumina or β"-alumina. For reasons of compatibility of thermal expansion coefficients, during heating and cooling of the cell between its operating temperature and ambient temperature, the header may be of α-alumina, which may be glass-welded to the open ends of the separator tubes.

In a particular embodiment of the invention, each of the tubes may be of the same length as all the other tubes, the cell having an upright operating attitude in which the tubes are suspended by the header from their open upper ends, the associated openings to which the open ends of the tubes are respectively sealed being provided in a flat α-alumina panel forming a lower wall of the header, the cell having a cathode current collector which has a multiplicity of downward projections which project from the header downwardly respectively into each of the tubes, to a position at or adjacent the closed lower end of each tube, the cathode current collector serving to connect in parallel individual amounts of active cathode material located in the respective tubes.

It is expected that the cell will usually either be of the sodium-sulphur/sulphide/polysulphide type or, preferably, of the alkali metal-transition metal/transition metal halide type, such as the sodium-nickel/nickel chloride type, the sodium-iron/ferrous chloride type, or a combination of the sodium-nickel/nickel chloride type and the sodium-iron/ferrous chloride type.

The cell may be of the alkali metal-transition metal/transition metal halide type, having a cathode which comprises an electronically conductive electrolyte-permeable porous matrix having a porous interior in which the active cathode material is dispersed in finely-divided particulate and/or thin-layer solid form, the matrix being impregnated by a molten salt electrolyte which saturates the porous interior of the matrix, the downward projections of the cathode current collector being electronically connected to the matrix. In particular the cells may have a cathode in which there are nickel and iron in a mass ratio of 88:12–80:20, preferably 86:14–82:18, eg 84:16. Usually, but not necessarily, nickel and iron will be essentially the only transition metals present in the cathode.

Preferably the molten salt electrolyte has a melting point below 170° C., more preferably bellow 160° C. The molten salt electrolyte may be a sodium aluminium halide electrolyte, in which there are essentially equal amounts of alkali metal halide and aluminium halide, the aluminium halide:alkali metal halide ratio being at most 1:1.

In particular, the molten salt electrolyte may be a sodium aluminium chloride electrolyte doped by at least one dopant which acts to lower its melting point but which is otherwise inert or at least compatible with the cell cathode environment. The cell may have a dopant content in total forming 1–30% by mass of the molten salt electrolyte, typically 3–20% by mass thereof.

Suitable dopants include zirconium tetrachloride ($ZrCl_4$), hafnium tetrachloride ($HfCl_4$) and suitable quaternary ammonium halide salts, such as the chloride salts, of formula $R_4NAlHal_4$, wherein each R is a hydrocarbon group such as an alkyl group, the R groups being the same or different from one another, and each Hal is a halide anion, which anions may be the same or different from one another, but conveniently all being Cl anions. Any $ZrCl_4$ and the $HfCl_4$ may each be present in proportions which form 5–10% by mass of the molten salt electrolyte; and any $R_4NAlHal_4$ may be present in a proportion which forms 10–30% by mass of the molten salt electrolyte.

Thus, each dopant may be selected from the group consisting of zirconium tetrachloride, hafnium tetrachloride, quaternary ammonium halide salts, and any mixtures thereof, any said tetrahalide salts forming in total 5–10% by mass of the molten salt electrolyte and any said ammonium halide salts forming in total 10–30% by mass of the molten salt electrolyte.

The housing may be a metal housing, such as a mild steel housing, the housing forming an anode current collector and an anode cell terminal being provided on the housing, the cathode current collector being connected to a cathode terminal which projects outwardly from the housing and is electronically insulated from the housing.

For close packing of cells alongside one another the cell may have a horizontal cross-section or plan view outline which is selected to permit a plurality of said cells to be close-packed alongside one another, in a close-packing arrangement. Conveniently, the cell may have a horizontal cross-section or plan view outline which is square, hexagonal, rectangular or triangular, so that a plurality of the cells can be close-packed alongside one another, in a hexagonal- or square close packing arrangement.

The tubes may be arranged so that their open upper ends, sealed to the header, which may, for example, comprise a flat α-alumina header panel, are in a grid arrangement selected from hexagonal grid arrangements and square grid arrangements.

Each tube may have an outer surface which is enclosed by a thin-walled shim, which may be perforated, coiled around the tube and forming a wick for wicking the molten anode material upwardly over and in contact with the outer surface of the tube.

The tubes may be arranged in a close-packed arrangement, the tubes defining a multiplicity of at least 6 longitudinally extending spaces therebetween and the cell comprising a multiplicity of anode current collectors in the form of electronically conductive rods located respectively in the spaces between the close-packed tubes.

While the arrangement may be a cubic-close packed arrangement, it is preferably a hexagonal-close packed arrangement. The spaces will be bounded, in the case of cubic-close packing, by four tubes and will be bounded, in the case of hexagonal-close packing, by three tubes.

Each anode current collector rod may fill the associated longitudinally extending space sufficiently to act as a wick for wicking molten anode material upwardly in said associated longitudinally extending space. Thus, the rods have a dual function, namely wicking molten anode material along the spaces between the tubes, and anode current collecting.

Preferably, each tube may be substantially in side-by-side contact with all the tubes adjacent or surrounding it. Thus, each rod may have a diameter such that it is substantially in contact, along its full length, with the tubes adjacent or surrounding it, although it need not be in contact with all the tubes along its full length, provided that it is close enough thereto to provide for adequate wicking of molten alkali metal anode material along the length of said space.

Preferably, each rod may be of aluminium and may extend along the associated longitudinally extending space for the full length of said space.

The closed ends of the tubes, and the tubes as a whole, may be bundled together, and may be held in close-packed abutment with one another, by a cup-shaped tray, typically a shallow aluminium or mild steel metal tray, having a bottom panel provided with an upstanding peripheral rim which embraces the outermost peripheral tubes of the bundle, the bottom panel of the tray optionally having a multiplicity of openings therethrough, respectively in register with the anode current collecting rods, each rod extending downwardly, from an upper end at or adjacent the header, to a lower end located in or adjacent the associated opening in the bottom panel of the tray. The bottom panel may be flat.

According to another aspect of the invention, there is provided a method of making a cell of the type described above, which comprises forming the tubes and parts of the header respectively from sintered ceramic solid electrolyte powder material and from sintered ceramic electronically insulating powder material, hermetically sealing the parts of the header together to form the header and hermetically sealing the open end of each tube to an associated opening into the header, the header being formed so that it has a feedthrough which, in an operative upright attitude of the tubes, leads into the top of the header, the method further comprising feeding the active cathode material or a precursor thereof into the open ends of the tubes via the feedthrough and via the header space in the header, after the tubes have been sealed to the header.

The active cathode material or its precursor is conveniently in the form of granules, which can be relatively free-flowing compared with powders, and the granules may be fed into the header space before or after the tubes and header have been inserted into the housing, which is conveniently a deep-drawn open-topped can having a lid which will be hermetically sealed in place after the tubes and header are in position in the can. Conveniently the cathode current collector is located in place in the header before the header parts are sealed together, so that it projects out of the openings in the header to which the tubes are sealed; and the shim wick may be wrapped around the bundle of tubes after the tubes are sealed to the header. The sealing together of the parts of the header, and the sealing of the tubes in the header, may be glass-welding. The tubes may be bundled together by inserting their lower closed ends downwardly into the tray and the anode current-collecting rods may be inserted into the spaces between the tubes after the tubes have been sealed to the header, and before or after the tubes have been inserted into the tray.

The feedthrough may be defined by a part of the header which is in the form of a collar, a pair of metal sealing rings respectively being sealed to the opposite ends of the collar by thermocompression bonding, one of the sealing rings being metal-welded to the lid of the housing and the lid in turn being metal-welded to the open upper end of the can, a metal plug, which may form the cathode terminal, in turn being welded into the other of the sealing rings, to close off the feedthrough, the cathode current collector being welded to said plug, and said plug and the associated sealing ring being electronically insulated and isolated from the other sealing ring and the associated can.

The invention will now be described, by way of non-limiting illustrative example, with reference to the accompanying diagrammatic drawings, in which.

Figure 7:
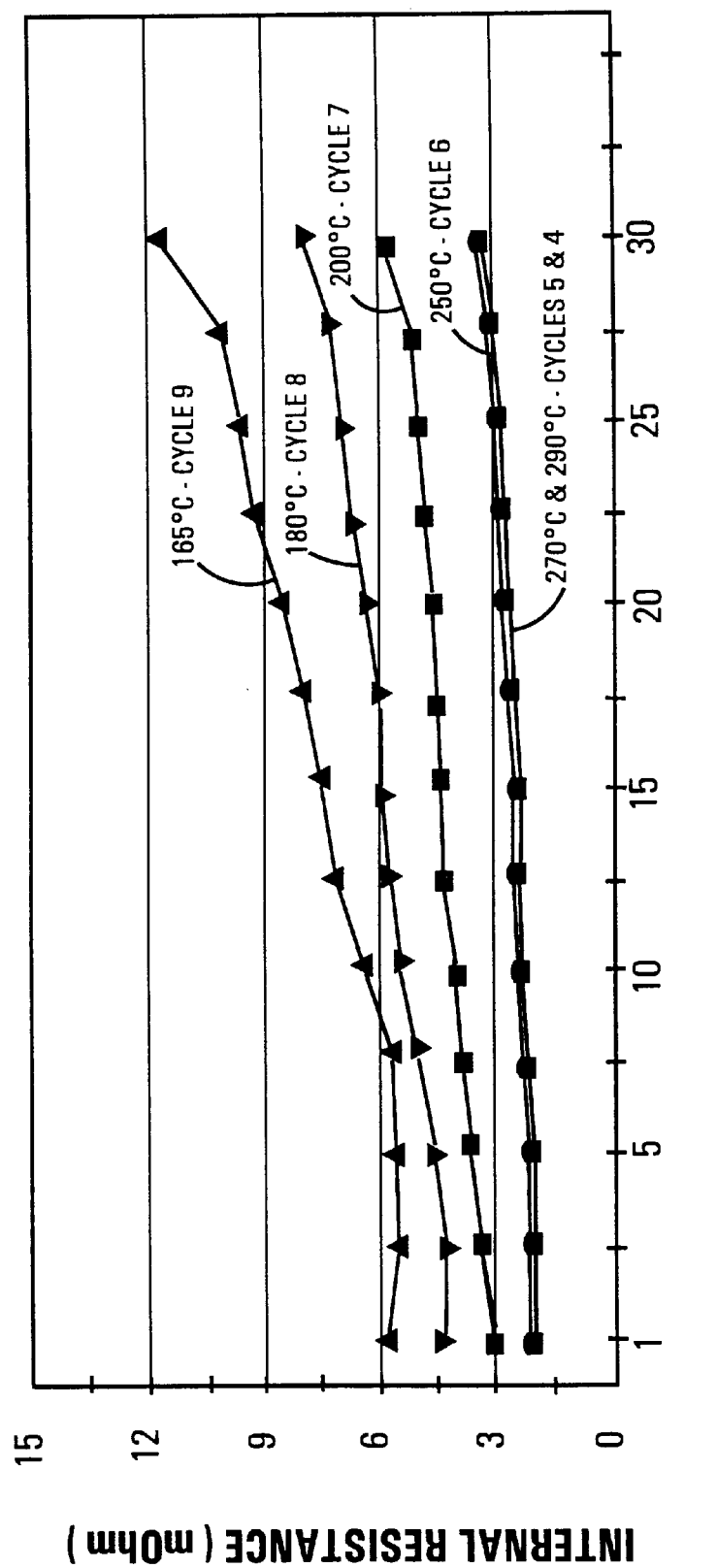
FIG. 7 shows, for a cell in accordance with the invention as shown in FIG. 1, with a nickel/nickel chloride ($NiCl_2$) cathode, a plot of initial cell internal resistance (mΩ) against cell capacity (Ah) at various temperatures.
Figure 8:
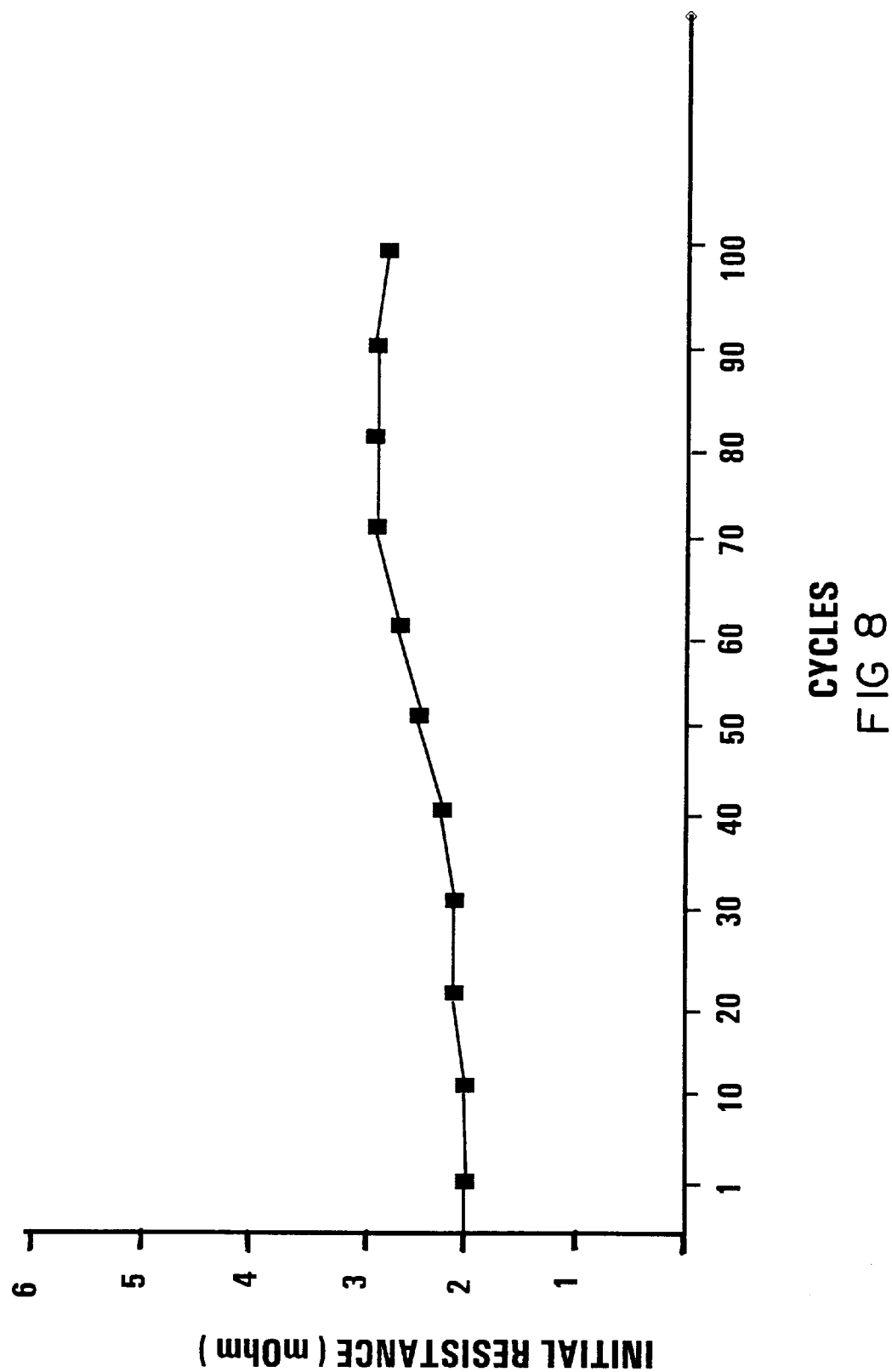
FIG. 8 shows, for the same cell whose performance is illustrated in FIG. 7, a plot of initial cell internal resistance (mΩ)) at the start of each discharge cycle against number of cell charge/discharge cycles at 270° C.
Figure 11:
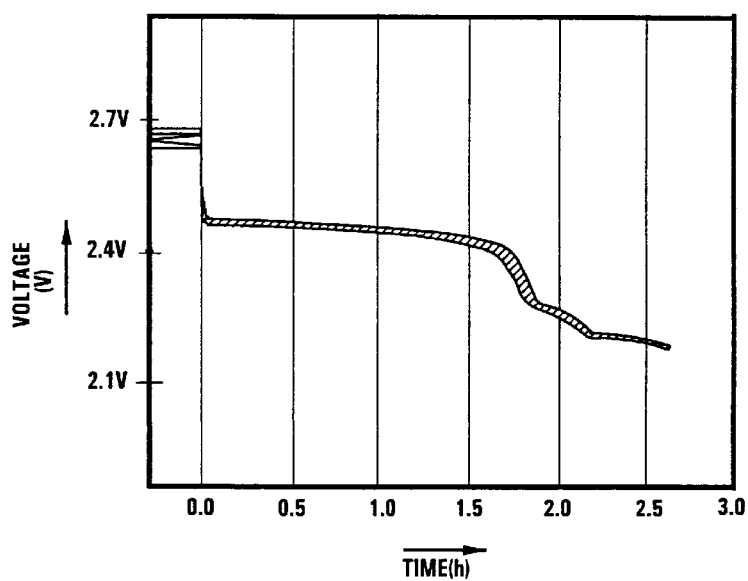
Figure 12:
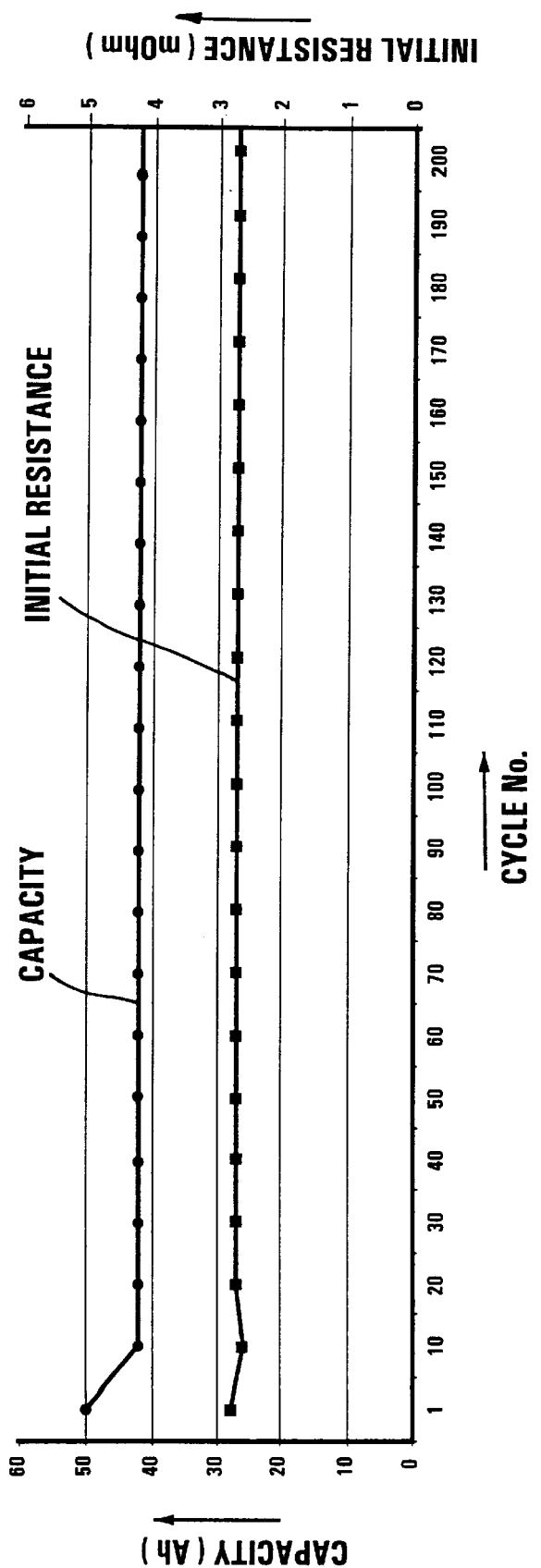

FIG. 11 shows, for cells different from that whose performance is illustrated in FIGS. 7 and 8, a plot of cell open circuit voltage (V) against time (hours) for the 142nd cycle of the cells when connected in series in a battery; and FIG. 12 shows, for the same cells and battery whose performance is illustrated in FIG. 11, a plot of both capacity (Ah) and initial cell internal resistance (mΩ) at the start of each discharge cycle against number of cell charge/discharge cycles.

Figure 1:
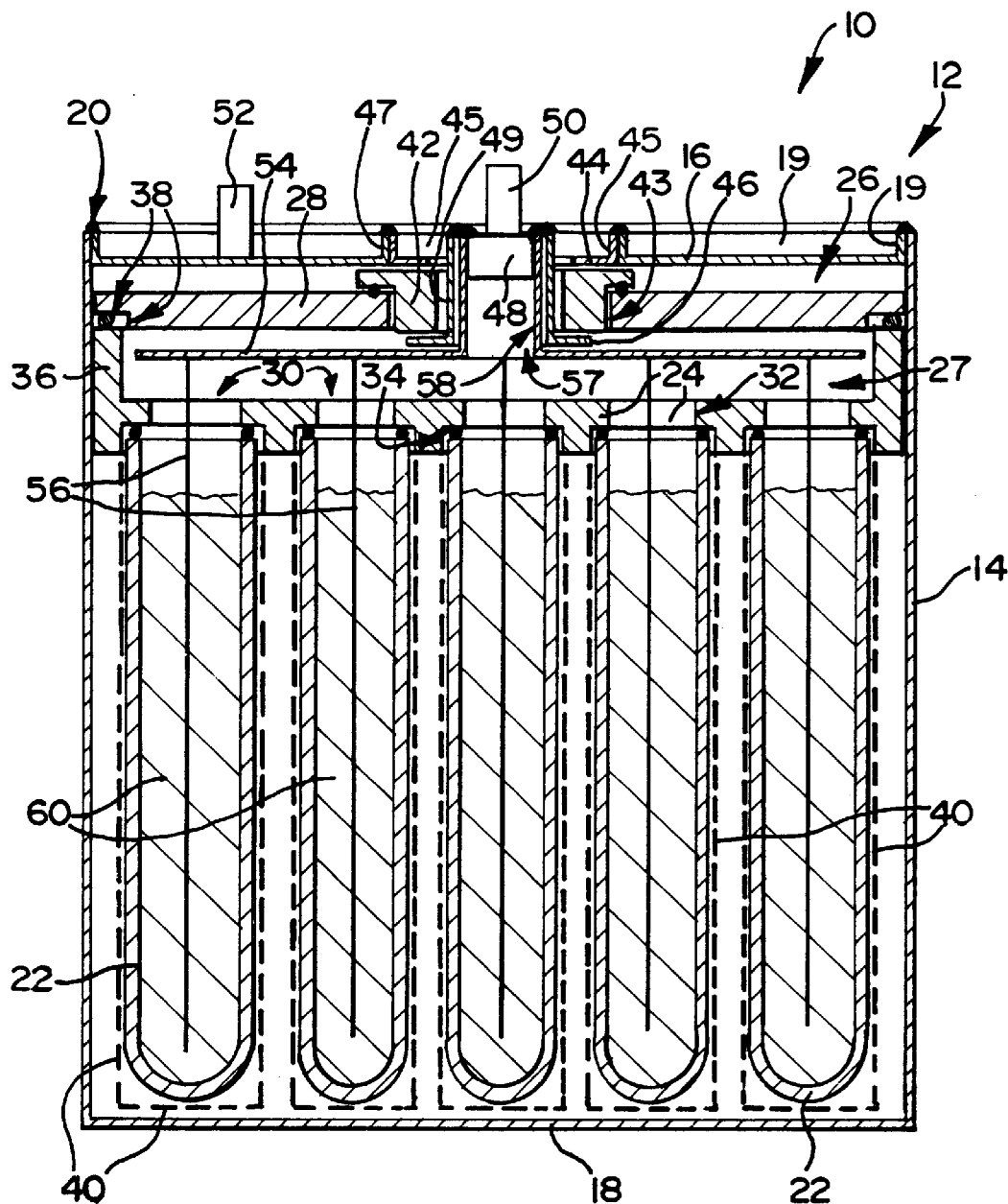
FIG. 1 shows a schematic sectional side elevation of an electrochemical cell according to the present invention.

In FIG. 1 of the drawings, reference numeral 10 generally designates a high temperature rechargeable electrochemical cell in accordance with the present invention. The cell 10 comprises a mild steel housing 12 which comprises a deep-drawn mild steel can 14 having a lid 16 and a flat floor 18 for supporting the cell 10 on a flat upwardly facing support surface in an upright operative attitude. The lid 16 has a peripheral rim 19 at its outer periphery whereby it is welded at 20 to a rim at the upper end of the side wall of the can 14. The housing 12, and the can 14, are of square plan view outline/horizontal cross-section.

Figure 2:
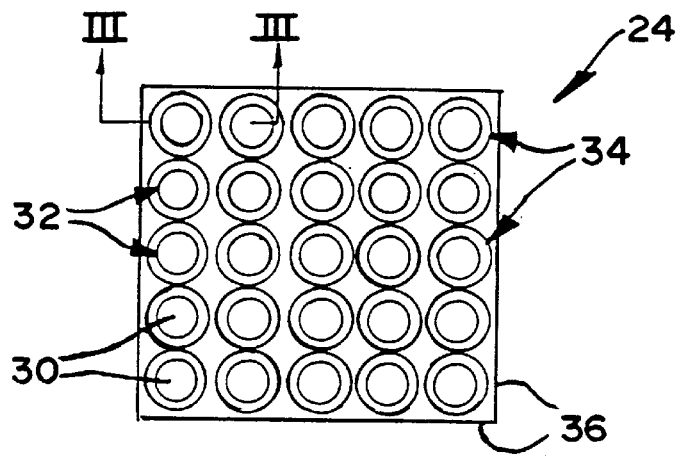
FIG. 2 shows, from below, a schematic layout, upside down, of the lower side of a flat header panel to which the separator tubes are attached.
Figure 3:
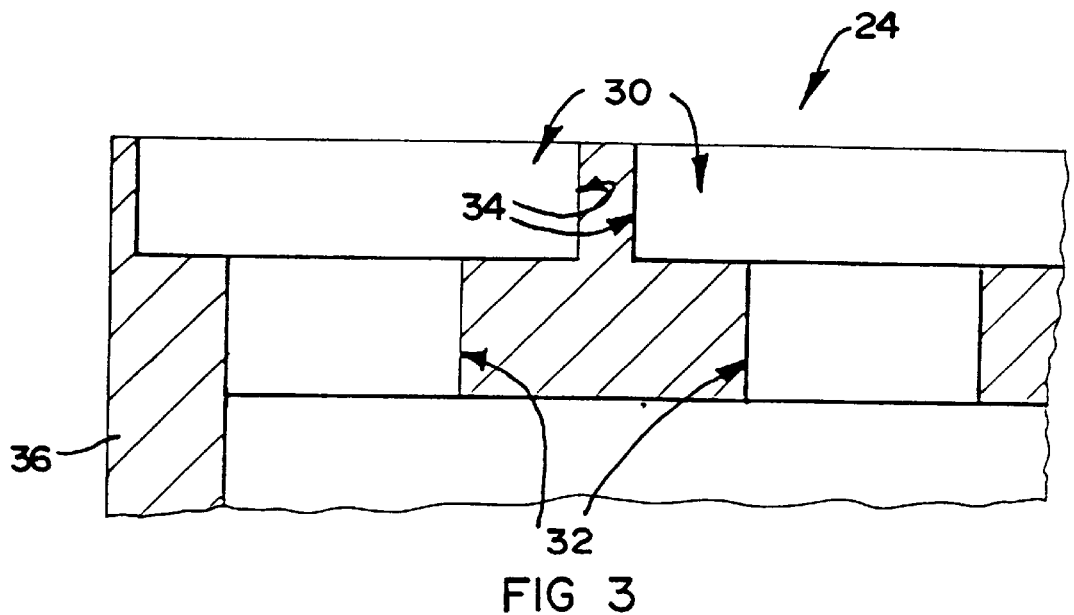
FIG. 3 shows a detail of the flat header panel of FIG. 2, upside down and in sectional side elevation, in the direction of line III—III in FIG. 2.

In FIGS. 1 to 4 of the drawings, a multiplicity of twenty-five sodium β"-alumina separator tubes 22 are shown in the can 14, having closed lower ends and open upper ends glass-welded to a flat α-alumina panel 24 forming the lower wall of a header 26, having an upper wall provided by a further α-alumina panel 28. The lower surface of the panel 24 is shown in FIG. 2, from which it is to be noted that there are twenty-five openings 30 (only two of which are shown in FIG. 3) through the panel 24, each having a narrow upper portion 32 of a diameter corresponding to the inner diameter of the tubes 22 and each having a wide lower portion 34 of a diameter corresponding to the outer diameter of the tubes 22 and in which the open upper ends of the tubes 22 are received and glass-welded (see particularly FIG. 1). The panel 24 has an upstanding peripheral rim 36 to the upper edge of which the outer periphery of the panel 28 is connected by glass-welding, the upper edge of the rim 36 being received in a peripheral rebate 38 at the outer edge of the panel 28, and glass beading being shown at 39 in the rebate 38 prior to melting for this purpose. The panels 24 and 28 together with the rim 36 constitute the header 26 and define therebetween a header space 27. A perforated mild steel (optionally nickel instead) shim 40 is coiled as a single layer around each tube 22, resiliently to grip the associated tube 22.

An α-alumina collar 42 is glass-welded into a central opening 43 in the panel 28. The collar 42 forms a central feedthrough leading through the panel 28 and has flat end surfaces forming, in use, upper- and lower end surfaces thereof, an upper sealing ring 44 and a lower sealing ring 46, each of which are of nickel, being thermocompression bonded respectively to said upper and lower end surfaces. The ring 44 has an outer peripheral upstanding rim 45 which is welded to a rim 47 along the periphery of a central opening in the lid 16; and the ring 46 has an inner peripheral upstanding rim 49 which extends upwardly and nests with clearance in the collar 42, adjacent but spaced from the inner curved wall of the collar. The upper end of the upstanding rim 49 of the ring 46 is closed off by a metal plug 48 which is welded in position therein and projects upwardly, above the lid 16, to form a cathode terminal 50. An anode terminal is welded at 52 to the top of the lid 16; and the collar 42 has a radially outwardly projecting peripheral flange at its upper end which extends over the periphery of the central opening 43 of the panel 28, via which flange the collar 42 is glass-welded to the upper surface of the panel 28. The can 14 forms an anode current collector, and a separate cathode current collector is provided for the cell, comprising a flat square nickel current collector plate 54, to the lower surface of which are welded the upper ends of twenty-five downward projections in the form of nickel cathode current collector rods 56, one for each tube 22. Each rod 56 projects centrally downwardly into its associated tube 22, the rod 56 having a lower end close to and spaced slightly above the closed lower end of the tube 22. The current collector plate 54 has a central opening 57 with an upstanding rim 58. The rim 58 nests in the rim 49 of the ring 46, the rim 49 of the ring 46 being sandwiched between the rim 58 and the collar 42, and the rim 58 being sandwiched between the rim 49 and plug 48 the plug 48 being welded into the rim 49 via the rim 58, the rims 49 and 58 being welded together at their upper edges.

To make the cell 10 the panel 28 can be placed upside-down, after the collar 42 with its rings 44 and 46 has been glass welded thereto, and after the central rim 58 of the current collector plate 54 has been welded to the upstanding rim 49 of the ring 46. The outer upstanding rim 36 of the lower header panel 24 is then glass welded in the associated peripheral rebate 38 of the panel 28, to form the header 26 with the rods 56 projecting out of the openings 30 of the panel 24. After this, the open ends of the tubes 24 can be glass-welded in the wide portions 34 of the openings 30 (before or after the shims 40 are wrapped around the associated tubes 22). The rim 47 of the lid 16 can then be welded to the upstanding rim 45 of the ring 44 and the rim 19 at the outer periphery of the lid 16 can then be welded at 20 to the upper edge or rim of the can 14. At this stage a cathode/solid electrolyte precursor in granular form can be fed via the central feedthrough defined by the collar 28 and via the header space 27 into the tubes 22, or electrolyte granules can be fed to the tubes 22 together with cathode precursor granules, with suitable vibration or tapping, to fill the tubes 22 to a suitable depth (the granules are shown at 60 in FIG. 1), to form a cell precursor, a small amount of sodium optionally being charged into the bottom of the can 14, sufficient when molten to be wicked by the shims 40 into contact with the lower ends of the tubes 22, the shims 40 in fact nearly touching the floor 18 of the can 16.

Figure 4:
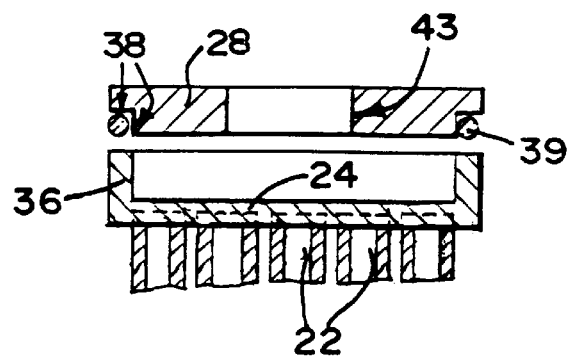
FIG. 4 shows a simplified cut-away view, corresponding to that of FIG. 1, of the header and the upper ends of the tubes.
Figure 5:
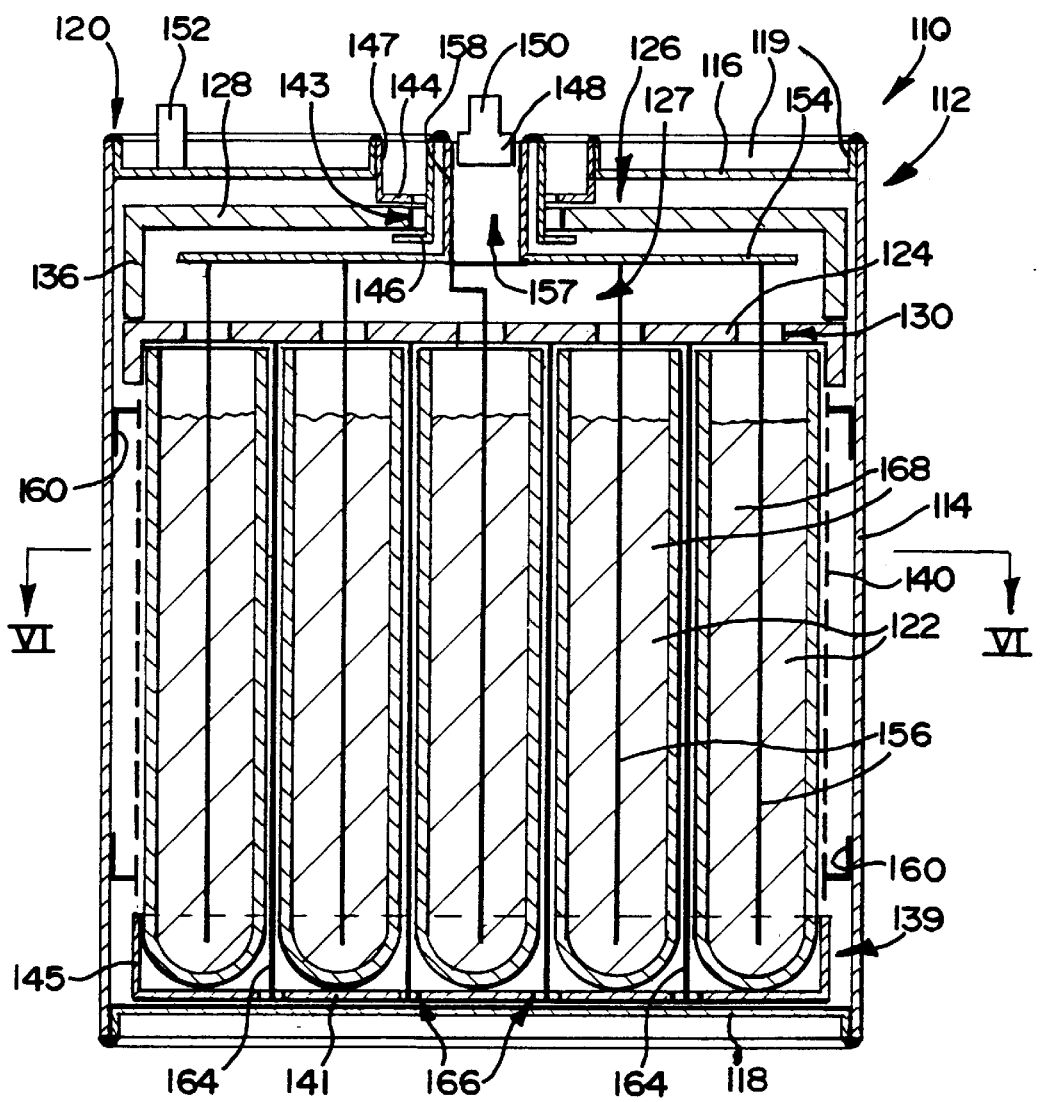
FIG. 5 shows a schematic sectional side elevation of another electrochemical cell according to the present invention, in the direction of line V—V in FIG. 6.
Figure 6:
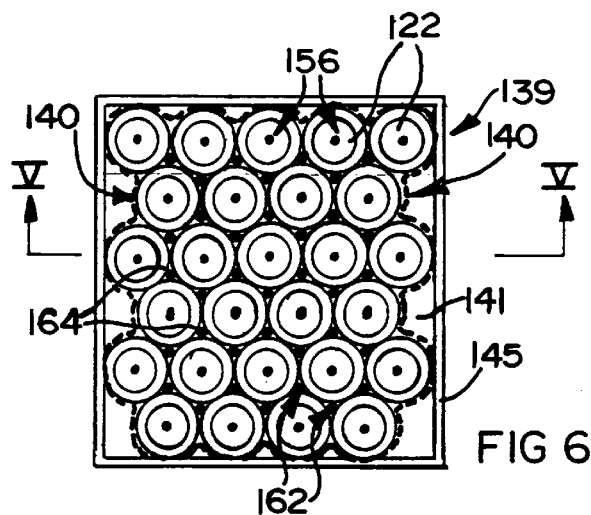
FIG. 6 shows, on a reduced scale relative to FIG. 5, a schematic sectional plan view of the tube bundle and tray of the cell of FIG. 5, in the direction of line VI—VI in FIG. 5.

Referring now to FIGS. 5 and 6 of the drawings, reference numeral 110 generally designates another high temperature rechargeable electrochemical cell in accordance with the present invention. For ease of reference, similar reference numerals have been used in FIGS. 5 and 6 of the drawings to those in FIGS. 1–4 of the drawings, to denote like or similar features.

In the can 114 are shown a multiplicity of twenty-seven β"-alumina separator tubes 122, having closed lower ends and open upper ends glass-welded to a flat α-alumina panel 124 forming the lower wall of a header 126, the upper wall of which is provided by a further α-alumina panel 128. There are twenty-seven openings 130 through the panel 124, over which the open upper ends of the tubes 122 are glass-welded (see FIG. 5). The panel 128 has a downwardly depending peripheral rim 136 to the lower edge of which the outer periphery of the panel 124 is connected by glass-welding. The panels 124 and 128 together constitute the header 126 and define therebetween a header space 127. The tubes 122 are in side-by-side abutment with one another, being arranged in a hexagonal-close-packed array. The tubes 122 are in the form of a bundle and a perforated mild steel (or nickel) shim 140 is shown coiled as a single layer around the bundle, resiliently to grip the bundle and hold its tubes 122 together. The lower ends of the tubes 122, and the bundle as a whole, are also held together by a shallow tray 139 having a flat bottom panel 141 and an upstanding rim 145.

There is a central opening 143 in the panel 128, which forms a central feedthrough through the panel 128. The panel 128 has flat upper and lower surfaces around the feedthrough 143, an upper sealing ring 144 and a lower sealing ring 146, each of which are of nickel, being thermocompression bonded respectively to said upper and lower surfaces around said opening 143. The ring 144 has an outer peripheral upstanding rim 147 which is welded to an upstanding rim along the periphery of a central opening in a lid 116; and the ring 146 has an inner peripheral upstanding rim which extends upwardly through the opening 143, adjacent and spaced from the inner curved wall of the opening 143. The upper end of the upstanding rim of the ring 146 is welded to the upper end of an upstanding rim 158 along the periphery of a central opening 157 in a current collector plate 154 which is described hereunder. The upstanding rim 158 of the central opening 157 of the plate 154 is closed off by a metal plug 148 which is welded in position and projects upwardly, above the lid 116, to form a cathode terminal 150. An anode terminal is welded at 152 to the top of the lid 116. The can 114 forms an anode current collector, and a separate cathode current collector is provided for the cell, comprising said current collector plate 154 which is of flat square nickel construction and has a central opening as mentioned above, to the lower surface of which are welded the upper ends of twenty-seven downward projections in the form of current collector rods 156, one for each tube 122. Each rod 156 projects centrally downwardly into its associated tube 122, the rod 156 having a lower end close to and spaced slightly above the closed lower end of the tube 122. The current collector plate 154 has, as mentioned above, a central opening 157 with an upstanding rim 158. The rim 158 nests in, and its upper end is welded to, the upper end of the rim of the ring 146, the rim of the ring 146 being located between the rim 158 and the periphery of the opening 143, the plug 148 being welded into the rim 158. Electronic connectors 160 are provided to connect the shim 140 to the can 114 (see FIG. 5). A multiplicity of thirty-five spaces 162 is defined between the tubes 122 (FIG. 6), and in each of these spaces 162 is provided an aluminium wicking—and anode current-collecting rod 164. A corresponding multiplicity of thirty-five openings 166 (FIG. 5) is provided through the panel 141 of the tray 139, each rod 164 being associated respectively with each of the openings 166. Each rod 164 extends the full length of its space 162 from an upper end at the panel 124 to a lower end in the associated opening 166 in the panel 141.

To make the cell 110 the panel 128 can be placed upside-down, after the rings 144 and 146 have been thermocompression-bounded thereto, and after the central rim 158 of the current collector plate 154 has been welded to the upstanding rim of the ring 146. The outer rim 136 of the upper header panel 128 is then glass welded to the periphery of the panel 124, to form the header 126 with the rods 156 projecting out of the openings 130 of the panel 124. After this the open ends of the tubes 124 can be glass-welded over the openings 130 (before the shim 140 is wrapped around the bundle of tubes 122). The rods 164 can then be inserted in the spaces 162 between the tubes 122 while the closed lower ends of the tubes are inserted into the tray 139 with the lower ends of the rods 164 in the openings 166. The inner rim of the lid 116 can then be welded to the upstanding rim 147 of the ring 144 and a rim 119 at the outer periphery of the lid 116 can be welded at 120 to the upper edge or rim of the can 114. At this stage a cathode/molten salt electrolyte precursor in granular form can be fed via the central feedthrough defined by the opening 143 and rim 158 of the opening 157 in the plate 154, and via the header space 127 into the tubes 122, or electrolyte granules can be fed to the tubes 122 together with cathode precursor granules, with suitable vibration or tapping, to fill the tubes 122 to a suitable depth (the granules are shown at 168 in FIG. 5), to form a cell precursor, a small amount of sodium optionally being charged into the bottom of the can 114, sufficient when molten to be wicked by the rods 164 and shim 140 into contact with the tubes 122, the rods 164 in fact nearly touching the floor 118 of the can 116.

Each of the cell precursors of the cells 10, 110 is taken in known fashion through a few charge/discharge cycles to commission it and convert it into a cell and to form cathode portions (see 60 in FIG. 1 and 168 in FIG. 5) in the tubes 22, 122, each comprising an electronically conductive porous electrolyte-permeable matrix having a doped sodium aluminium chloride molten salt electrolyte impregnated therein to saturate the matrix, and having a transition metal/transition metal halide active cathode material dispersed in a particulate and/or thin layer form in the porous interior of the matrix. Molten sodium will surround the tubes 22, 122 in the anode compartment defined between the tubes 22, 122 and the cans 14, 114.

Doping of the molten salt electrolyte will typically be with $ZrCl_4$ or $HfCl_4$ or $R_4NCl_4$, or a suitable mixture of two or more thereof, to give it a melting point of less than 160° C. and preferably less than 155° C., any $ZrCl_4$ and $HfCl_4$ dopants each being used in proportions forming 5–10% by mass of the molten salt electrolyte, and any $R_4NCl_4$ being used in a proportion which forms 10–30% by mass of the molten salt electrolyte, the total amount of dopant or dopants added forming less than 30% by mass of the electrolyte. A transition metal/transition metal halide active cathode material is dispersed in fine particulate- and/or thin-layer form in the porous interior of the matrix and molten sodium surrounds the tubes 22, 122 in the anode compartment defined between the tubes 22, 122 and can 14, 114. Suitable powder mixes for the granules are described in U.S. Pat. No. 4,529,676 (which provides a discharged cathode precursor) and U.S. Pat. No. 4,797,333 (which provides an overdischarged cathode precursor).

The electrolyte is sodium aluminium chloride ($NaAlCl_4$) in which the molar proportion of $AlCl_3$ is no greater than that of NaCl at all states of charge of the cell.

For example, a cell according to FIG. 1 of the drawings has been made from a can 14 having a depth of 140 mm, and a square 50 mm×50 mm plan view outline or horizontal cross-section. In this example the tubes 22 were 130 mm in length, each having an outer diameter of 9.1 mm and a wall thickness of 0.7 mm, the feedthrough closed by the plug 48 having an inner diameter of 10 mm. In this regard it should be noted that FIG. 1 is not strictly to scale. A substantially similar cell has also been made according to FIG. 5 of the drawings using the same tubes and can as were used for the Example according to FIG. 1.

A feature of the cells of the present invention is that a high separator area, conducive to high power discharge and rapid charge/discharge rates, can be achieved while, importantly, achieving circular/cylindrical cathode symmetry with narrow cathode dimensions in a direction transverse to the long axes of the tubes 22, 122.

As mentioned above, the cell 10 has twenty-five tubes 22 and the cell 110 twenty-seven tubes 122. Furthermore, the relationship of the combined area of the tubes 22, 122 available for conduction of sodium cations between the anode compartment of the cells 10, 110 and its cathode compartment, as defined by the quotient:

$$\frac{\text{combined separation tube area (mm}^2\text{)}}{\text{housing interior space volume (mm}^3\text{)}}$$

has a value of greater than 2.0 mm$^{-1}$. In this regard the cathode compartment is made up of the interiors of the tubes 22, 122 and the interior or space 27, 127 of the header 26, 126 and the anode compartment is made up of the volume of the interior of the can 14, 114 outside the tubes 22, 122 and header 26, 126.

Preliminary tests have been conducted by the Applicant on cells according to the invention, which show substantial promise for reversible high-power operation.

Thus, a sodium-nickel chloride cell having an open circuit voltage of about 2.58 (the sodium-nickel chloride couple) was constructed in accordance with FIG. 5 of the drawings and having a mass of about 900 g and a theoretical capacity of about 40 Ah. The cell was taken through a substantial number of charge/discharge cycles at various temperatures. In accordance with one of the tests the cell, at an 80% depth of discharge, ie after 32 Ah of its capacity had been discharged (at a constant current of 20 Amperes), was subjected to a power pulse of 30 seconds duration at a pre-set maximum current value of about 180 amps or a lower voltage limit of 1.72 volts and at various operating temperatures. Results are set forth in the following table, Table 1, which indicates the discharge cycle number for each pulse, and the cell current in Amperes, voltage in Volts, internal resistance in m$\Omega$ and power in Watts at the end of each 30-second pulse.

TABLE 1

Cell Characteristics at end of 30 Second Power Pulse at Maximum Current

| Cycle No. | Temperature (° C.) | Current (A) | Voltage (V) | Resistance (m$\Omega$) | Power (W) |
| --- | --- | --- | --- | --- | --- |
| 4 | 290 | 178.7 | 1.99 | 3.3 | 355.6 |
| 5 | 270 | 180.4 | 1.94 | 3.5 | 350.0 |
| 6 | 250 | 180.6 | 1.91 | 3.7 | 345.0 |
| 7 | 200 | 174.8 | 1.72 | 4.9 | 300.6 |
| 8 | 180 | 139.0 | 1.72 | 6.2 | 239.0 |
| 9 | 165 | 91.2 | 1.72 | 9.5 | 156.8 |
| 83 | 270 | 179.6 | 1.95 | 3.5 | 350.2 |

It is to be noted from Table 1 that the cell delivered substantially the same power at 270° C. after the 83rd cycle as after the 5th cycle. As expected, internal resistance was sensitive to temperature changes. However, virtually no improvement was seen above 250° C. as the cell hardware internal resistance, as contrasted with the internal resistance arising from the molten salt electrolyte, became limiting at that temperature. Power was nevertheless adequate, even at 165° C., as shown in Table 1.

For the 40 Ah cell whose results are shown in Table 1, the cell characteristics are further shown in FIGS. 7 and 8.

In FIG. 7 is shown a plot of initial cell internal resistance against cell capacity (depth of discharge) for the cell whose results are shown in Table 1, at different temperatures, from fully charged, down to a depth of discharge of about 80% (about 32 Ah). For discharging a constant current value of 20 amps was used and for charging, IUI charging, with an initial current of 10 amps up to a voltage of 2.67 volts and a final current of 3 amps, was used. The temperatures tested were 165° C., 180° C., 200° C., 250° C., 270° C. and 290° C.

Turning to FIG. 8 results are given at 270° C. for the same cell, subjected to the same charging current and voltage and the same discharge current as in FIG. 7. Initial cell internal resistance is seen to increase slowly with cell cycle number from 2 m$\Omega$ at the start of cycling up to about 2.8 m$\Omega$ at 70–90 cycles, followed by a slight drop to about 2.7 m$\Omega$ after 100 cycles.

The results set forth in Table 1 and in FIGS. 7–8 demonstrate that, with the cell geometry of the present invention, as illustrated, acceptably high power can be obtained at temperatures as low as 165° C. These results show that, depending on the availability of suitable low-melting electrolytes based, for example, on NaAlCl$_4$, acceptable power may be available in terms of the present invention, at temperatures as low as 150° C. or even 120° C.

Figure 9:
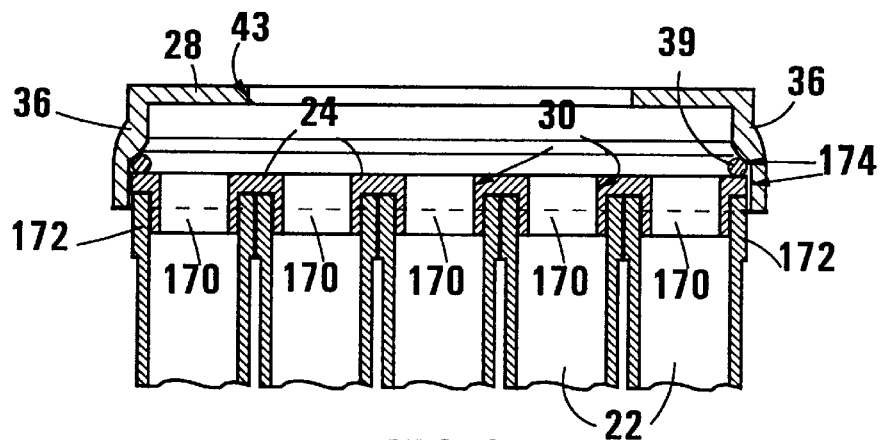
FIG. 9 shows a view similar to FIG. 4 of a variation of the construction shown in FIG. 4.

In FIG. 9, instead of having the open upper ends of the tubes 22 received in the lower portions 34 of openings 30 as shown in FIGS. 3 and 4, there are cylindrical downwardly and outwardly projecting peripheral rims or spigots 170 around each opening 30, the openings 30 being of constant diameter and the spigots 170 are received and glass-welded spigot/socket fashion, in the open upper-ends of the tubes 22, which are thickened and reinforced at 172. Furthermore, instead of having the panel 24 provided with a rim 36 and the panel 28 without a rim (as in FIGS. 3 and 4), the panel 24 has no rim and the rim 36 is provided on the panel 28, projecting downwardly from the periphery of the panel 28. The outer or peripheral edge of the panel 24 is welded in a rebate 174 in the rim 36, whose lower edge encircles the thickened parts at 172 of the outer or peripheral tubes 22.

Figure 10:
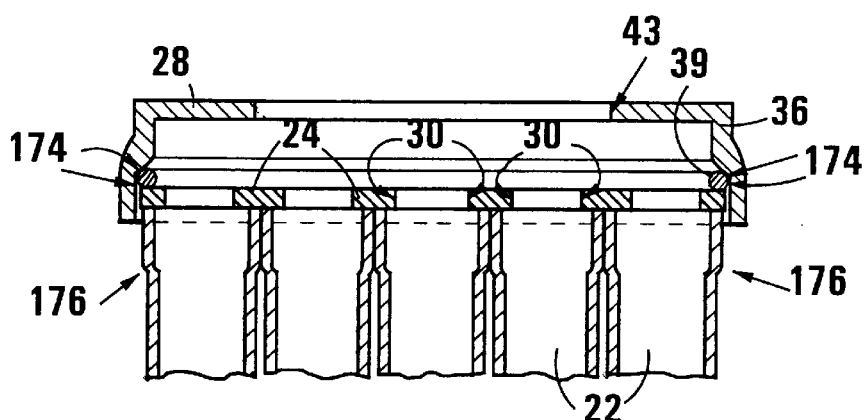
FIG. 10 shows a view similar to FIG. 4 of a further variation of the construction shown in FIG. 4.

In FIG. 10, the same reference numerals are used as in FIG. 9, unless otherwise specified. In FIG. 10 the rims or spigots 170 of FIG. 9 are omitted, and the open ends of the tubes 22 are simply butt-welded around the peripheries of the openings 30 to the flat lower surface of the panel 24 by a layer of glass (not shown) on the lower surface of the panel 24. Furthermore, the thickened parts at 172 of the upper ends of the tubes 22 of FIG. 9 are omitted and the upper ends of the tubes 22 in FIG. 10 are, instead, of increased internal and external diameter relative to the remainders of the tubes 22 to provide shoulders at 176. This feature allows the upper ends of the tubes 22 to be closed-packed in abutment with one another, but provides for somewhat enlarged spaces 162 (see FIG. 6) between the tubes 22 for receiving the rods 164 (see FIG. 6), and the same consideration indeed applies also to the construction of FIG. 9.

The construction shown in FIG. 10 also allows, during construction and when the panels 24 and 28 are upside down as shown in FIG. 2, the panel 24 to be received in the rebate 174 in the rim 136, whose lower or free edge, which is directed upwardly in the upside-down condition of the panels 24 and 28, receives and embraces the open ends of the outermost or peripheral tubes 22. This assists in supporting the tubes 22 and in holding them upright, in the correct positions and in close-packed abutment with one another, during glass-welding of the tubes 22 to the panel 24.

Glass welding for FIGS. 9 and 10 is thus made possible in a single operation, using a glass panel (not shown) in the form of a glass paper, glass mat, or glass sheet formed to have a shape conforming with that of the panel 24 and having openings registering with the openings 30; and inserting this panel between the open ends of the tubes 22 and the panel 24, followed by heating in a furnace to melt the glass. Instead, a layer of glass paste, applied to the panel 24 between the openings 30 can be used for this purpose, between the tubes 22 and the panel 24. This glass panel or paste can indeed supplant the glass beading 39 shown in FIGS. 9 and 10, melting thereof causing it to flow sealingly into the rebate 174.

Further cells were made in accordance with FIG. 1 and in accordance with the invention, essentially similar to the sodium-nickel/nickel chloride cell described above. However, whereas the cell described above had nickel as substantially the only electrochemically active cathode transition metal, any iron therein being associated merely with sulphur doping of the cathode, as ferrous sulphide and contributing negligibly to cell capacity, each further cell had a substantial amount of electrochemically active iron in its cathode, together with nickel, this iron contributing materially to cell capacity. Thus, in these further cells, 15% by mass of the nickel of the cathode of the sodium-nickel/nickel chloride cell described above was replaced by iron, the cathode precursor granules used in making the cathode containing, mixed together and dispersed homogeneously with each other, nickel powder and iron powder in an 85:15 mass ratio. Each further cell has a mass of 945 g, a name plate capacity of 42 Ah (theoretical capacity of 50 Ah); and nominal cell dimensions of 52 mm×52 mm plan view outline and a depth of 180 mm, including its terminals. It used 25 tubes 22 in a square array (see FIGS. 1 and 2).

These further cells were connected in series in batteries and were subjected to tests wherein the batteries were put through charge/discharge cycles at various temperatures, usually 270° C. Batteries of two, four or five cells were employed. At various depths of discharge, after various proportions (32 Ah, 34 Ah and 40 Ah) of capacity had been discharged (at a constant current of 20 Amperes), the cells in the batteries were subjected to power pulses of 30 seconds duration. Results are set forth in the following table, Table 2, which is similar to Table 1, but omits cell internal resistance while indicating also the number of cells in the battery and the depth of discharge in Ah at which the pulse was started.

TABLE 2

| Number of Cells in Battery | Depth of Discharge at Start of Pulse (Ah) | Cycle No | Temperature (° C.) | Current (A) | Voltage (V) | Power (W) |
| --- | --- | --- | --- | --- | --- | --- |
| 2 | 32 | 8 | 270 | 241.1 | 1.745 | 420.7 |
| 2 | 32 | 50 | 270 | 247.2 | 1.745 | 431.3 |
| 2 | 34 | 152 | 270 | 242.7 | 1.720 | 417.4 |
| 2 | 34 | 204 | 270 | 239.1 | 1.720 | 411.3 |
| 5 | 34 | 30 | 250 | 232.8 | 1.720 | 400.4 |
| 4 | 34 | 20 | 187 | 181.9 | 1.720 | 312.8 |
| 4 | 34 | 24 | 175 | 161.6 | 1.720 | 278.0 |
| 2 | 40 | 8 | 270 | 218.0 | 1.745 | 380.4 |

The battery of five cells was taken through a total of over 200 charge/discharge cycles at a constant discharge current of 16 A to a depth of discharge of 42 Ah and with IUI charging with an initial current of 10 A up to a voltage of 2.67 V and a final current of 1 A. FIG. 11 shows discharge curves for the five cells in question, for the 142nd discharge cycle, being plots of cell voltage (V) against time (h). These curves are very close together and overlap, so that they are shown in FIG. 11 as a bundle or envelope having a shaded area. The curves initially have a plateau at slightly above 2.5 V for about the first 1½ hours, representing discharge of nickel chloride, after which, for about an hour, there is an inflection in the curves representing combined nickel chloride/ferrous chloride discharge followed by ferrous chloride discharge. Similar curves for the 15th and 100th cycles were closer together, with smaller bundles or envelopes of lower area, but of substantially the same shape.

FIG. 12 shows flat curves for both average initial internal resistance (squares) and average capacity (circles) for the five cells of the battery over the full 200 cycles, after slight initial drops in both capacity and internal resistance associated with cell commissioning and running in.

The results in Table 2 and FIGS. 11 and 12 show excellent cell reproducibility up to 142 cycles and excellent cell stability up to 200 cycles. Furthermore, the pulse power measurements in Table 2, which are done at about two thirds of the open circuit voltage of about 2.58 V, showed that values of above 400 W a cell were attainable at 250° C. or better, and values of above 250 W a cell were achievable at temperatures as low as 170° C.

I claim:

1. A high temperature rechargeable electrochemical cell which comprises a housing defining an interior space, a ceramic solid electrolyte separator located in the housing and dividing the interior space into an anode compartment and a cathode compartment, an alkali metal active anode material located in the anode compartment, and an active cathode material located in the cathode compartment and electrochemically coupled by the solid electrolyte separator to the active anode material, the cell having an operating temperature at which the active anode material is molten and the solid electrolyte separator being of a material which is a conductor of cations of the active anode material, the solid electrolyte separator comprising a multiplicity of at least 5 ceramic solid electrolyte separator tubes, each tube having an open end and a closed end, the active cathode material being located in the interiors of the tubes and each tube having its open end hermetically sealed to an associated opening leading from the tube into a header space defined by a header comprising electronically insulating ceramic material, the relationship of the combined area of the tubes available for conduction of cations of active anode material between the anode compartment and the cathode compartment, and the volume of the interior space, as defined by the quotient:

$$\frac{\text{combined separator tube area } (l^2)}{\text{housing interior space volume } (l^3)}$$

(in which l is a unit of length),
having a value of at least $1.0\ l^{-1}$, the tubes being arranged side-by-side to define a multiplicity of at least 6 longitudinally extending spaces therebetween and the cell comprising a multiplicity of anode current collectors in the form of electronically conductive rods located respectively in said spaces defined between the tubes.

2. A cell as claimed in claim 1, in which the multiplicity of tubes amounts to at least 10, with the quotient being at least $1.5\ l^{-1}$.

3. A cell as claimed in claim 2, in which the multiplicity of tubes amounts to at least 25, with the quotient being at least $2.0\ l^{-1}$.

4. A cell as claimed in claim 1, in which the active anode material is sodium, the material of the separator being selected from β-alumina and β"-alumina.

5. A cell as claimed in claim 1, in which each of the tubes is of the same length as all the other tubes, the cell having an upright operating attitude in which the tubes are suspended by the header from their open upper ends, the associated openings to which the open ends of the tubes are respectively sealed being provided in a flat α-alumina panel forming a lower wall of the header, the cell having a cathode current collector which has a multiplicity of downward projections which project from the header downwardly respectively into each of the tubes, to a position at or adjacent the closed lower end of each tube, the cathode current collector serving to connect in parallel individual amounts of active cathode material located in the respective tubes.

6. A cell as claimed in claim 5, in which the cell is of an alkali metal-transition metal/transition metal halide type, having a cathode which comprises an electronically conductive electrolyte-permeable porous matrix having a porous interior in which the active cathode material is dispersed in finely-divided particulate and/or thin-layer solid form, the matrix being impregnated by a molten salt electrolyte which saturates the porous interior of the matrix, the downward projections of the cathode current collector being electronically connected to the matrix.

7. A cell as claimed in claim 6, which has a cathode in which there are nickel and iron in a mass ratio of 88:12–80:20.

8. A cell as claimed in claim 6, in which the molten salt electrolyte is a sodium aluminium chloride electrolyte doped by at least one dopant which acts to lower its melting point but which is otherwise compatible with the cell cathode environment, the cell having a dopant content in total forming 1–30% by mass of the molten salt electrolyte.

9. A cell as claimed in claim 8, in which each dopant is selected from the group consisting of zirconium tetrachloride, hafnium tetrachloride, quaternary ammonium halide salts, and any mixtures thereof, any said tetrahalide salts forming in total 5–10% by mass of the molten salt electrolyte and any said ammonium halide salts forming in total 10–30% by mass of the molten salt electrolyte.

10. A cell as claimed in claim 5, in which the housing is a metal housing, the housing forming an anode current collector and an anode cell terminal being provided on the housing, the cathode current collector being connected to a cathode terminal which projects outwardly from the housing and is electronically insulated from the housing.

11. A cell as claimed in claim 1, in which the cell has a horizontal cross-section or plan view outline which is selected to permit a plurality of said cells to be close-packed alongside one another, in a close-packing arrangement.

12. A cell as claimed in claim 1, in which the tubes are arranged so that their open upper ends, sealed to the header, are in a grid arrangement selected from hexagonal grid arrangements and square grid arrangements.

13. A cell as claimed in claim 1, in which each tube has an outer surface which is enclosed by a thin-walled shim coiled around the tube and forming a wick for wicking the molten anode material upwardly over and in contact with the outer surface of the tube.

14. A cell as claimed in claim 1, in which the tubes are arranged in a close-packed arrangement.

15. A cell as claimed in claim 1, in which each anode current collector rod fills the associated longitudinally extending space sufficiently to act as a wick for wicking molten anode material upwardly in said associated longitudinally extending space.

16. A cell as claimed in claim 1, in which each rod is of aluminium, each rod extending along the associated longitudinally extending space for the full length of said space.

17. A cell as claimed in claim 14, in which the closed ends of the tubes, and the tubes as a whole, are bundled together, and are held in close-packed abutment with one another, by a cup-shaped tray having a bottom panel provided with an upstanding peripheral rim which embraces the outermost peripheral tubes of the bundle, the bottom panel of the tray having a multiplicity of openings therethrough, respectively in register with the anode current collecting rods, each rod extending downwardly, from an upper end at or adjacent the header, to a lower end located in or adjacent the associated opening in the bottom panel of the tray.

18. A method of making a cell as claimed in claim 1, which comprises forming the tubes and parts of the header respectively from sintered ceramic solid electrolyte powder material and from sintered ceramic electronically insulating powder material, hermetically sealing the parts of the header together to form the header and hermetically sealing the open end of each tube to an associated opening into the header, the header being formed so that it has a feedthrough which, in an operative upright attitude of the tubes, leads into the top of the header, the method further comprising feeding the active cathode material or a precursor thereof into the open ends of the tubes via the feedthrough and via the header space in the header, after the tubes have been sealed to the header.

19. A high temperature rechargeable electrochemical cell which comprises a housing defining an interior space, a ceramic solid electrolyte separator located in the housing and dividing the interior space into an anode compartment and a cathode compartment, an alkali metal active anode material located in the anode compartment, and an active cathode material located in the cathode compartment and electrochemically coupled by the solid electrolyte separator to the active anode material, the cell having an operating temperature at which the active anode material is molten and the solid electrolyte separator being of a material which is a conductor of cations of the active anode material, the solid electrolyte separator comprising a multiplicity of at least 5 ceramic solid electrolyte separator tubes, each tube having an open end and a closed end, the active cathode material being located in the interiors of the tubes and each tube having its open end hermetically sealed to an associated opening leading from the tube into a header space defined by a header comprising electronically insulating ceramic material, the relationship of the combined area of the tubes available for conduction of cations of active anode material between the anode compartment and the cathode compartment, and the volume of the interior space, as defined by the quotient:

$$\frac{\text{combined separator tube area } (l^2)}{\text{housing interior space volume } (l^3)}$$

(in which l is a unit of length),
having a value of at least $1.0\ l^{-1}$, the cell being of an alkali metal-transition metal/transition metal halide type, having a cathode which comprises an electronically conductive electrolyte-permeable porous matrix having a porous interior in which the active cathode material is dispersed in finely-divided particulate and/or thin-layer solid form, the matrix being impregnated by a molten salt electrolyte which saturates the porous interior of the matrix, the molten salt electrolyte being a sodium aluminium chloride electrolyte doped by at least one dopant which acts to lower its melting point but which is otherwise compatible with the cell cathode environment, the cell having a dopant content which in total forms 1–30% by mass of the molten salt electrolyte, each dopant being selected from the group consisting of zirconium tetrachloride, hafnium tetrachloride, quaternary ammonium halide salts, and any mixtures thereof, any said tetrahalide salts forming in total 5–10% by mass of the molten salt electrolyte and any said ammonium halide salts forming in total 10–30% by mass of the molten salt electrolyte.

* * * * *

UNITED STATES PATENT AND TRADEMARK OFFICE
CERTIFICATE OF CORRECTION

PATENT NO. : 6,007,943
DATED : December 28, 1999
INVENTOR(S) : Johan Coetzer

It is certified that error appears in the above-identified patent and that said Letters Patent is hereby corrected as shown below:

Title page, [57], please replace "(in which l is a unit of length)" with --(in which l is a unit of length in mm)--.

Column 1, line 38, please replace "(in which l is a unit of length)" with --(in which l is a unit of length in mm)--.

Column 12, line 41, please replace "(in which l is a unit of length)" with --(in which l is a unit of length in mm)--.

Column 14, line 46, please replace "(in which l is a unit of length)" with --(in which l is a unit of length in mm)--.

Signed and Sealed this

Third Day of April, 2001

Attest:

NICHOLAS P. GODICI

Attesting Officer     Acting Director of the United States Patent and Trademark Office